United States Patent

[11] 3,577,049

| [72] | Inventors | Joseph P. Madurski<br>Royal Oak;<br>Rex W. Presley, Livonia; Ralph W.<br>Rothfusz, Southfield, Mich. |
|---|---|---|
| [21] | Appl. No. | 670,726 |
| [22] | Filed | Sept. 26, 1967 |
| [45] | Patented | May 4, 1971 |
| [73] | Assignee | The Bendix Corporation |

[54] SELF-COMMUTATED ELECTROMOTIVE DEVICE
15 Claims, 12 Drawing Figs.

[52] U.S. Cl. .................................................. 318/138,
318/254, 318/480, 310/80, 310/82, 310/83
[51] Int. Cl. ...................................................... H02k 29/00
[50] Field of Search ........................................... 74/804;
310/80, 82, 83; 318/138, 254, 480

[56] References Cited
UNITED STATES PATENTS

| 1,471,606 | 10/1923 | Holmdahl | 74/804 |
| 3,023,348 | 2/1962 | Cox | 318/138 |
| 3,037,400 | 6/1962 | Sundt | 74/804 |
| 3,096,467 | 7/1963 | Angus et al. | 318/138 |
| 3,374,410 | 3/1968 | Cronquist et al. | 318/138 |
| 3,452,227 | 6/1968 | Welch | 310/82 |

*Primary Examiner*—Oris L. Rader
*Assistant Examiner*—Gene Z. Rubinson
*Attorneys*—James L. O'Brien and Plante, Arens, Hartz, Smith & Thompson

ABSTRACT: An electromotive device including a stator provided with electromagnets, an eccentric armature mounted for movement by the electromagnets, and an output member which is concentric with the stator and is driven by the armature movement. A light-actuated electromagnet commutation system is disclosed. The armature of the electromotive device has epicyclic movement relative to both the stator and the output member with the two epicyclic movements cooperating to provide an integrated motor transmission unit.

INVENTORS
JOSEPH P. MADURSKI
REX W. PRESLEY
BY RALPH W. ROTHFUSZ

*James L. O'Brien*
ATTORNEY

PATENTED MAY 4 1971

INVENTORS
JOSEPH P. MADURSKI
REX W. PRESLEY
BY RALPH W. ROTHFUSZ

*James L. O'Brien*
ATTORNEY

INVENTORS
JOSEPH P. MADURSKI
REX W. PRESLEY
BY RALPH W. ROTHFUSZ

*James L. O'Brien*
ATTORNEY 3,577,049

SELF-COMMUTATED ELECTROMOTIVE DEVICE

Cross-Reference to Related Applications

Copending applications Ser. No. 523,111 filed Jan. 26, 1966 entitled "Power Converting Apparatus" and Ser. No. 667,459 filed Sept. 13, 1967 both assigned to the assignee of this application, are related to the present application.

BACKGROUND OF THE INVENTION

This invention relates to electromotive devices, (motors and/or generators) particularly to those which are self commutated. It also relates to electromotive devices in which there is an epicyclic motion between the armature and stator and a similar epicyclic motion between the armature and the output shaft. The stator, the armature, and the output shaft all have gears which cooperate as a result of the epicyclic motion to provide a desired speed transmission ratio between the speed of rotation of the electrical field and the speed of the output shaft.

The usual commutation systems shown in the prior art incorporate commutator brushes and armature commutator contacts and these have sparking and mechanical wear between the commutator contacts and the commutator brushes. In order to use such motors and generators in explosive atmospheres it is necessary to completely shield the commutator system. Certain attempts have been made to use light-actuated commutation systems but the power output of light-actuated switches is relatively small, thus limiting the power of the motor. The present invention provides an electromotive device which has a controllable high output power with a compact speed-reducing means with no sparking and very low relative movement between any parts. The motor is ideal where compact-actuating means are needed in environments that do not permit sparking and where temperature or other conditions make lubrication difficult.

SUMMARY OF THE INVENTION

In the preferred embodiment of the present invention the coils of a DC motor are commutated by electric power means through light-actuated semiconductors which are sequentially illuminated and thus actuated to turn electrical power onto the stator coils. Means are provided to limit the magnitude of the current to protect the coils and also to vary the electrical energy input to control the motor by controlling the electrical energy introduced into the coils of the stator. The armature of the motor moves in an epicyclic motion with respect to the stator and has an epicyclic motion with respect to the output shaft which is concentric with the stator axis. The stator, the armature and the output shaft have meshing gears that provide speed reduction through the epicyclic movement of the armature. This results in an electrical to mechanical power translation unit with low-speed, high-torque and low-friction losses with the elimination of commutator arcing. It also provides an integrated low inertia, high-performance motor transmission unit capable of producing low-speed, high-torque rotary motion with high acceleration capability and low weight requirements.

Such a unit is ideal for use in many applications, for example in outer space environments where the atmosphere may be flammable and where the temperature and extreme vacuum are such as to make lubrication difficult. The length and level of the pulse of electrical energy introduced to the stator coils can be controlled so that the total electrical energy introduced into the motor may be varied and thereby vary the speed-torque characteristics of the motor at will. Silicon-controlled rectifiers actuated by the light commutator provide means for introducing high electrical currents into the stator coils and thus give a much more powerful motor than was heretofore possible with previously used light-actuated commutators.

It is therefore an object of the present invention to provide a high output self-commutated electromotive device.

It is a further object of the present invention to provide an integrated low inertia electric motor transmission unit having a stator and an output shaft which are concentric to each other and are geared through the armature which has an epicyclic movement with respect to the stator.

Further objects, features and advantages of this invention will become apparent from a consideration of the following description, the appended claims, and the accompanying drawing in which:

DESCRIPTION OF THE PREFERRED EMBODIMENTS

Figure 1:
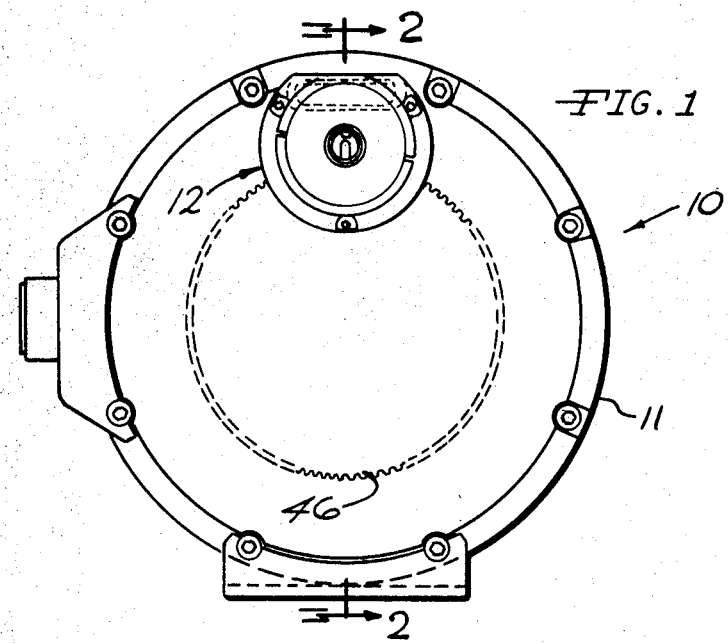
FIG. 1 is an elevational view of one form of the electromotive device of this invention shown in the form of a motor.
Figure 2:
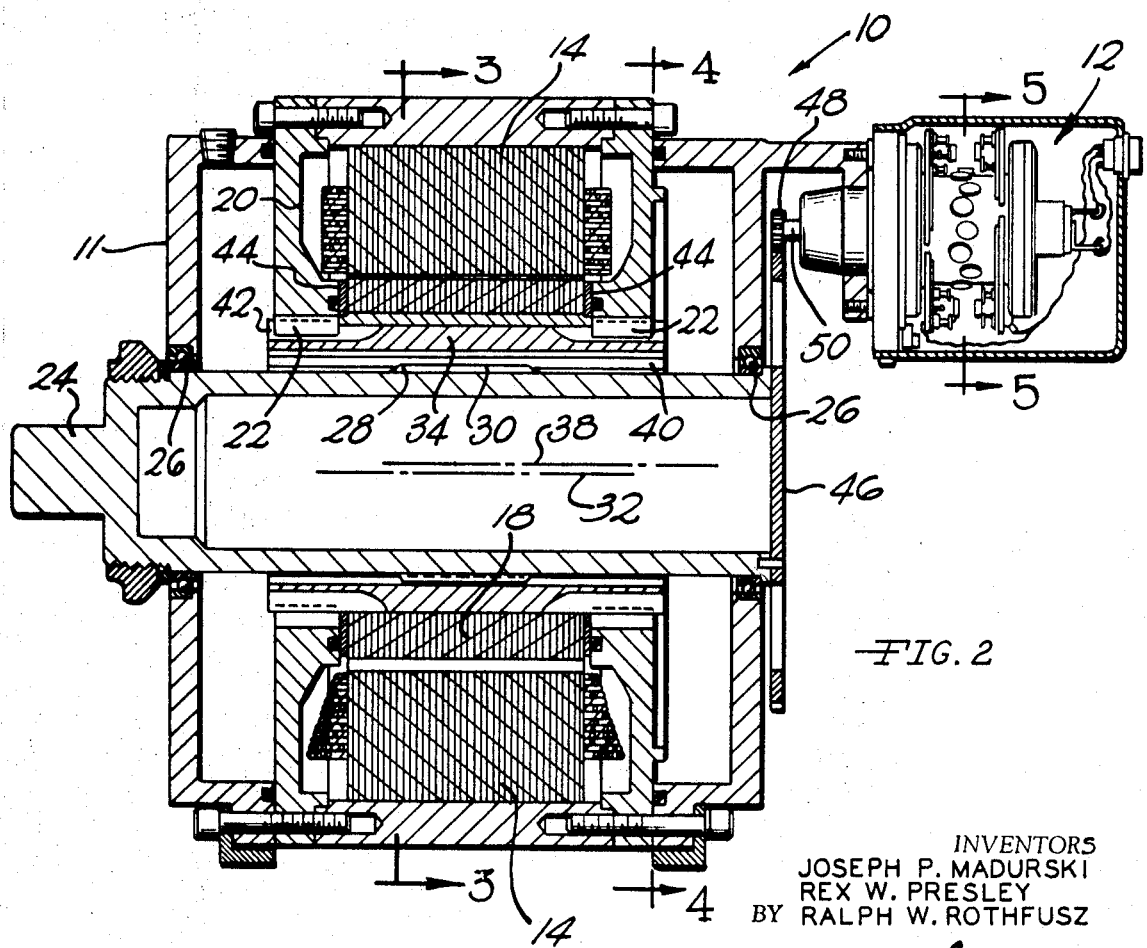
FIG. 2 is a transverse sectional view of the motor shown in FIG. 1, looking substantially along the line 2-2 in FIG. 1.

With reference to the drawing, the motor of this invention, indicated generally at 10, is illustrated in FIGS. 1 and 2 as including a housing 11 on which a switch assembly 12 is mounted. The motor 10 has a multipolar stator 14, each pole of which is wound with an electrical energizing coil, mounted in a fixed position within the housing 11. An armature 18, disposed radially within the stator 14, moves in an epicyclic orbit with respect to the stator 14, as will be shown later.

Figure 4:
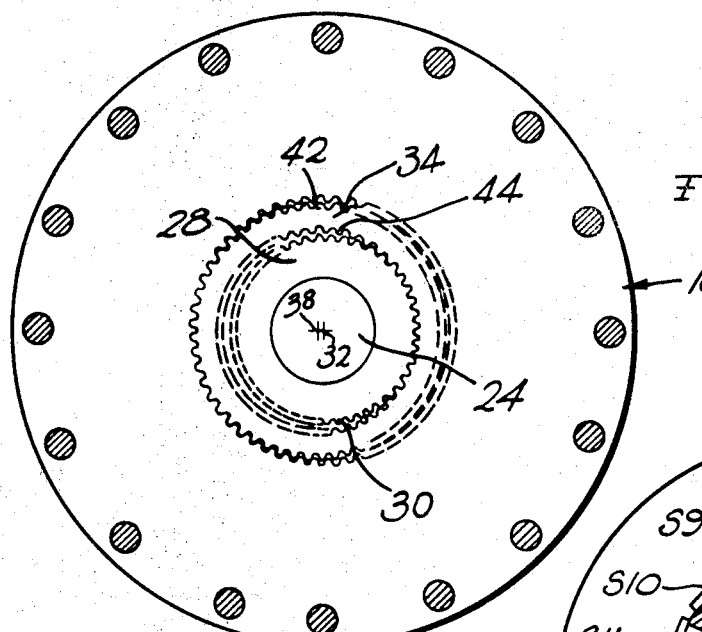
FIG. 4 is a reduced sectional view of the motor of this invention looking along the line 4-4 in FIG. 2 and showing the gear components of the motor.

As best appears in FIGS. 2 and 4, a stationary gear assembly 20 is mounted in a fixed position on the housing 11 and provided with two sets of internal teeth 22 arranged on a pitch circle concentric with the stator 14. An output shaft 24 for the motor 10 is mounted on housing bearings 26 and carries an output gear 28 which is concentric with respect to the stationary gear 20. In other words, the teeth 30 on output gear 28, the stationary gear teeth 22 and the stator 14 are all concentric with respect to the output shaft axis 32. A floating ring gear 34, secured to the armature 18 and having an axis 38 which is eccentric with respect to the axis 32, has internal teeth 40 which mesh with the output gear teeth 30, and external teeth 42 which mesh with the stationary gear teeth 22. Thrust bearings 44 at opposite ends of the armature 18 support the armature 18 and ring gear 34 against axial movement but allow the armature 18 and ring gear 34 to both rotate and move radially relative to axis 32. A large gear 46 mounted on one end of the output shaft 24 meshes with a small gear 48 mounted on a drive shaft 50 for the switch assembly 12.

Figure 3:
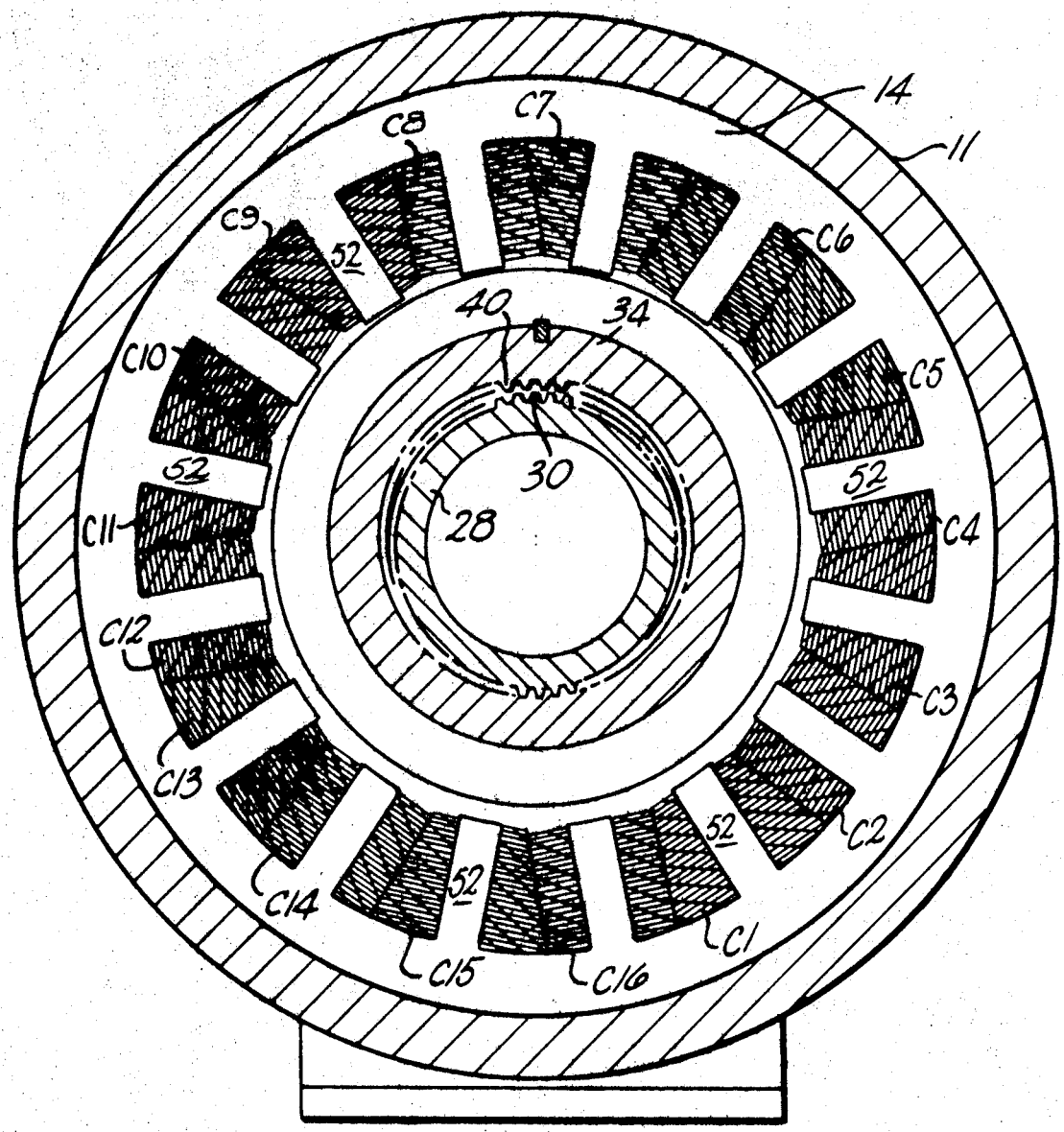
FIG. 3 is an enlarged sectional view of the motor of FIG. 1 looking along the line 3-3 in FIG. 2 showing the arrangement of the coils on the stator.

As shown in FIG. 3, the stator 14 has 16 poles 52 and 16 coils C1—16, inclusive, with each pole being wound with one of the coils although it is to be understood that a number of poles and coils other than 16 can be used. The coils C1—16 are energized in a sequence from the light switch assembly 12 in a manner to be hereinafter described. The poles 52 coact with the coils to provide a rotating magnetic field that attracts the armature 18 to the poles where the coils are energized, thus causing the armature 18 to rotationally translate with an epicyclic motion around the inside of the stator, with the stationary gear teeth 22 and the ring gear teeth 42 in mesh at the point of the greatest magnetic force and the ring gear teeth 40 and the output gear teeth 30 in mesh at a point 180° from the point of greatest magnetic force.

This action is shown more particularly in FIG. 4, which shows that the axis 38 of the armature 18 orbits about the axis 32 of the output shaft 24 and stator 14. This eccentric movement of the armature 18, which is an epicyclic movement in so far as either the output shaft gear 28 or the stationary gear 20 is concerned, maintains the teeth of the stationary gear 20 and ring gear 34 in mesh at one point and maintains the teeth of the ring gear 34 and output gear 28 in mesh at a point 180° from that point, in the illustrated form of the motor 10. The eccentricity of the movement of the armature will be governed by the pitch diameters of the component gears and is such as to permit the epicyclic movement of the armature without gear interference. The stationary gear 20 has a greater number of teeth than the ring gear 34 has external teeth and the ring gear 34 has a greater number of internal teeth than the output gear 28 in the illustrated motor. The speed transmission ratio between the speed of rotation of the magnetic field in the stator 14 and the mechanical rotation of the output shaft 24 is represented by the following equation:

$$TR = \frac{N_8 N_6}{N_8 N_6 - N_2 N_4}$$

where:

$N_2$ = number of teeth on stationary gear 20,
$N_6$ = number of teeth 42 on ring gear 34,
$N_4$ = number of teeth 40 on ring gear 34, and
$N_8$ = number of teeth on output gear 28.

It is to be understood that the relative positions and sizes of the gears 20, 28 and 34 can be varied, as is more particularly explained in copending application Ser. No. 667,459, referred to previously herein, while still obtaining the advantageous features of the motor transmission unit of this invention. These variations are capable of providing a desired transmission ratio for a particular installation.

Figure 5:
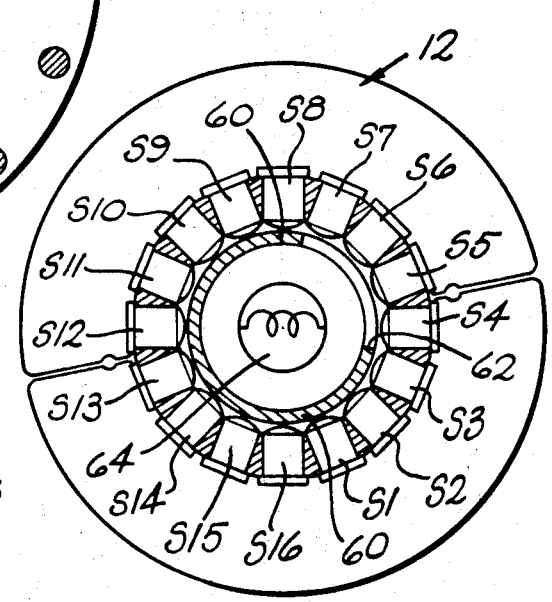
FIG. 5 is an enlarged sectional view of the motor of FIG. 1 as seen from substantially the line 5-5 in FIG. 2, showing the light-actuated commutator assembly.

As best appears in FIG. 5, the switch assembly 12 includes a tubular light shield 60 having an opening 62 therein and attached to the shaft 50 for rotation therewith. A light source 64 is concentrically located within the light shield 60 and light-activated, silicon-controlled rectifiers S1—16, inclusive, are concentrically located around the light shield. The light-activated, silicon-controlled rectifiers S1—16, inclusive, are connected to the coils C1—16, inclusive, as shown in the current diagram of FIG. 7, and are also connected in parallel to an oscillator 66 which is an AC source of electrical current. Thus as the shield 60 is rotated by the shaft 50, light is transmitted from the light source 64 to the light-activated, silicon-controlled rectifiers S1—16, inclusive, consecutively to make the rectifiers conducting in sequence as the light from the light source 64 falls on each rectifier.

As the light falls upon each rectifier, it becomes conducting and this operates other switches so current is allowed to flow from the power source to one of the coils C1—16, inclusive, to energize the latter. Thus as the light-activated switches are made conducting in sequence, the coils of the motor 10 are energized to produce consecutive magnetic fields moving in one direction about axis 32 to in effect provide a rotating magnetic field that causes the armature 18 and the ring gear 34 secured thereto to roll around in an epicyclic movement with the ring gear teeth 42 always in mesh with the stationary gear teeth 22. As the ring gear 34 orbits, the gear teeth 30 on the output shaft 24 are in contact with the ring gear teeth 40 at a position 180° from the point of contact between the gear teeth 22 and 42 and thus a reduction of speed between the speed of the rotating magnetic field and the mechanical speed of the output shaft is produced depending on the number of teeth in the gears 20, 28 and 34, in accordance with the formula quoted above.

Figure 6:
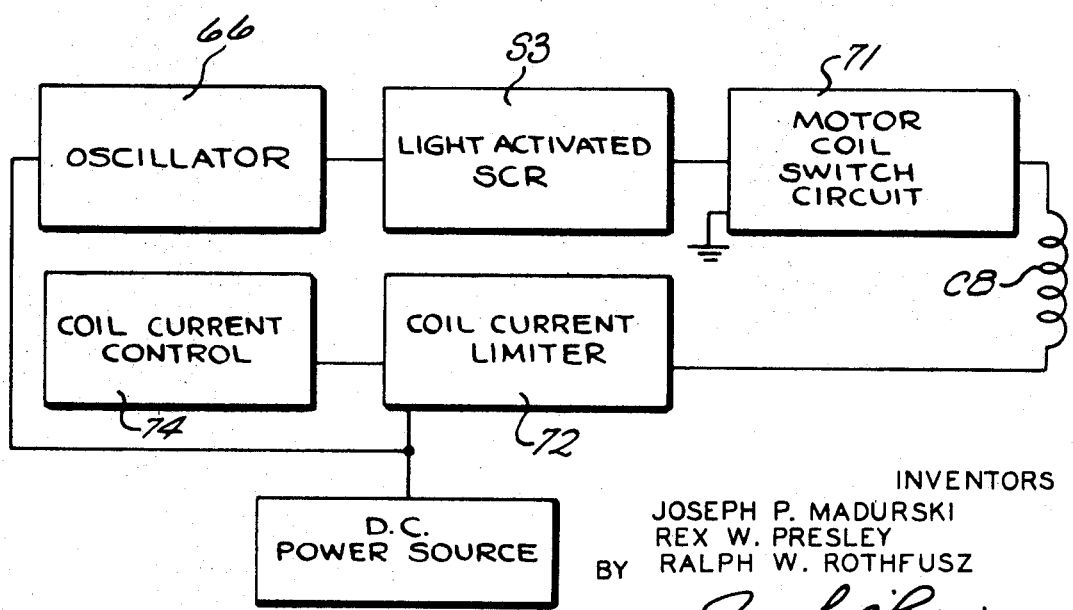
FIG. 6 is a block diagram showing the light-actuated commutator circuit for energizing the stator coils.

Referring now more particularly to FIG. 6, the power supply for motor 10 is a coil current limiter circuit 72 which converts direct current into pulsating unidirectional current. The limiter circuit 72 furnishes pulsating unidirectional voltage which is commutated to the motor coils, one of which is indicated at C8 by a motor coil switch circuit 71, which is controlled by a light-activated SCR, shown as S3. The circuit 72 also acts as a safety circuit to limit the maximum current which can flow in the motor coils. The coil current control circuit 74 controls the width of the voltage pulses applied to the motor coils and consequently the mechanical output of the motor 10.

Figure 7:
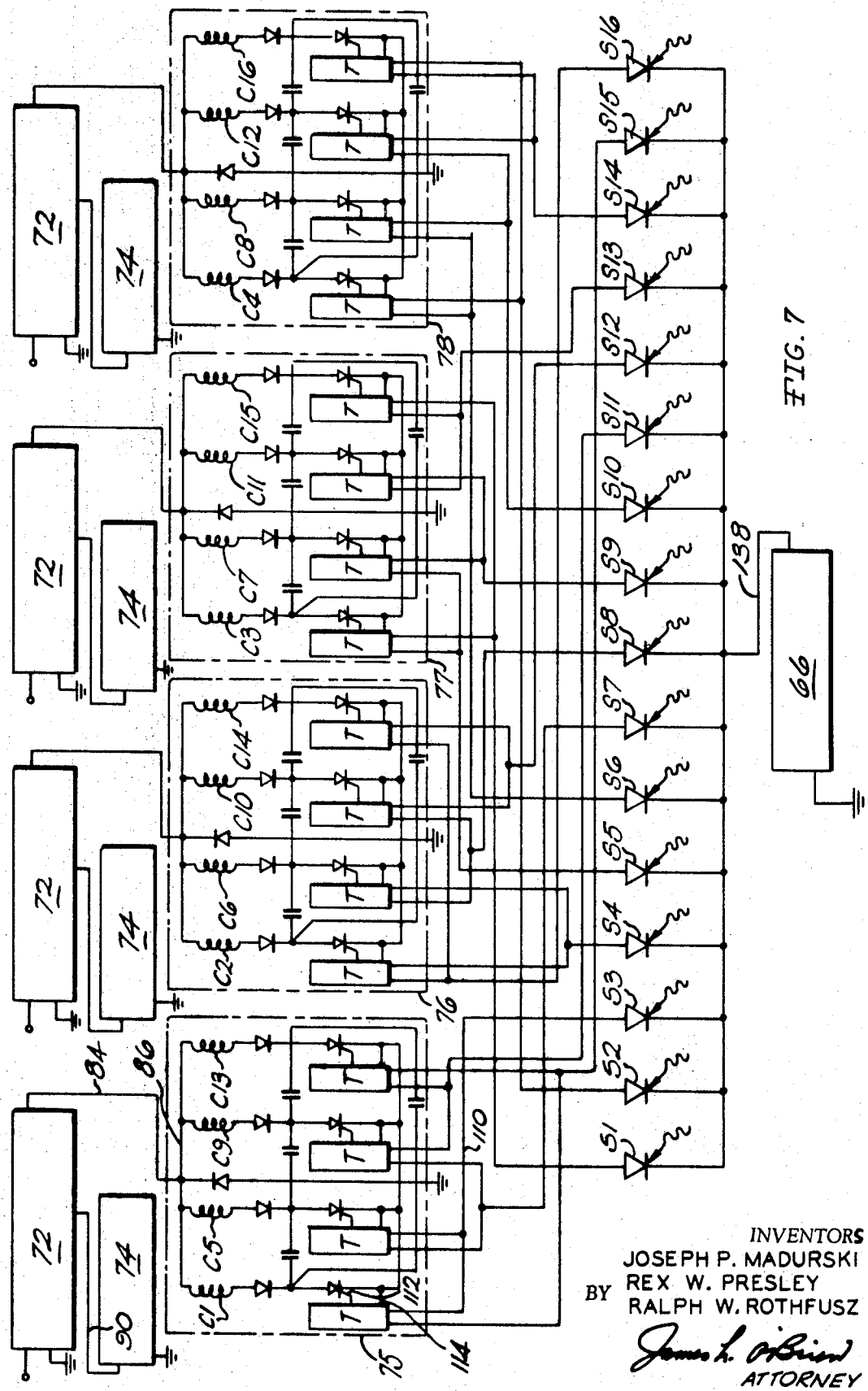
FIG. 7 is a combination block and schematic wiring diagram of the circuit of the present invention.

FIG. 7 is a schematic diagram of the circuitry for energizing coils C1—16, inclusive. These coils are arranged in numerical sequence about the housing 11 as shown in FIG. 3, but as will be seen by the circuitry of FIG. 7, the coils are divided into four groups 75—78, inclusive, each group containing four coils. The first group 75 contains circuitry for coils C1, 5, 9 and 13; the second group 76 has identical circuitry for coils C2, 6, 10 and 14. The third group 77 has identical circuitry for coils C3, 7, 11 and 15 and the fourth group 78 has identical circuitry for coils C4, 8, 12 and 16. The motor 10 is a self-commutating motor. Since the output shaft 24 rotates at a much slower speed than the rotating field in coils C1—16, due to the gear reduction accomplished by gears 20, 28 and 34, the shield 60 must be rotated at a speed higher than the speed of output shaft 24. The gear ratio of gears 46 and 48 is thus the inverse of the gear reduction to provide the desired speed of rotation of the field. The shield opening 62 is of an arcuate length to provide for light from source 64 falling on four adjacent rectifiers S1—16 at all times. However, since the coils in each group 76, 77, 78 and 79 are spaced by four coils about the armature 18 only one coil in each group will be activated at any one time, and as that coil is deenergized, due to movement of light shield opening 62, another coil in the same group is energized. As a result, a current limiter 72 is effectively provided for each coil by providing one current limiter 72 for each group 76, 77, 78 and 79, as shown in FIG. 7, thus simplifying the commutation circuitry.

Each of the light-actuated, silicon-controlled rectifiers S1—16 is connected to two coils through a trigger circuit T (shown in detail in FIG. 11) shown in box form in FIG. 7. For example, rectifier S1 is connected to the trigger circuits for coils C3 and C15 and rectifier S2 is connected to the trigger circuits for coils C4 and C16.

These connections for the light-activated, silicon-controlled rectifier circuits results in clockwise rotation of the armature when clockwise signals are applied from a direction control circuit 70 (FIG. 11) to the trigger circuits and counterclockwise rotation of the armature when counterclockwise rotation signals are applied from the direction control circuit 70 to the trigger circuits. Direction control 70 has a clockwise (CW) and a counterclockwise (CCW) lead to each of the trigger circuits of FIG. 7. These inputs are not shown for the sake of simplicity but may be of the common type of switches. Each coil in the group 75 is connected to a coil current limiter circuit, shown generally in FIGS. 6 and 7 at 72 and shown in more detail in FIG. 8. The coils in the groups 76, 77, and 78 are also connected respectively to identical coil limiter circuits 72. The purpose of the coil current limiter circuits 72 is to prevent the coil current from exceeding a predetermined maximum, thereby insuring the life of the motor components by preventing excessive electrical currents. Attached to each of the current limiter circuits 72 are variable coil current control circuits 74 shown in detail in FIG. 9, which is hereinafter described.

The purpose of the variable current control circuits 74 is to apply the input voltage, which in this particular embodiment is 24 volts, a variable percentage of the time and thereby vary the electric current input to the motor and thus vary the output of the motor. For example if the input voltage is applied for only 10 percent of the time then an average of 2.4 volts will be applied to each coil resulting in a 10 percent power output of the motor.

The oscillator 66 (FIG. 6) has a period which is less than the shortest "on-time" period of each coil. The oscillator voltage is applied to the cathodes of the silicon-controlled rectifiers S1—16, and when the oscillator output voltage goes high the current in each of these light-activated, silicon-controlled rectifiers will drop below the value required to hold it on and the silicon-controlled rectifier will return to a nonconducting state. Normally the motor coil switch for the actuated coil will receive several trigger pulses while the coil is on, but since the switch is another SCR, it will remain on after the first trigger until a voltage of reverse polarity is applied to the SCR anode to turn it off, as will be described later.

The coil current limiter circuit 72 (FIG. 8) includes a lead 82 attached to a 24-volt power source and a lead 84 connected to the conductor 86 in the switch circuit 75 (FIG. 7). A lead 88 in circuit 72 is grounded and a lead 90 is connected to the associated coil current control circuit 74 (FIG. 7). There are five transistors Q1—5, which are signalled sequentially in the circuit 72 and a sixth transistor Q6 which is used in conjunction with the variable coil current control circuit 74. A variable resistor R1 is positioned in the emitter circuit of transistor Q5 so that the total current going to the coils must pass through resistor R1. If there is no current in resistor R1, transistors Q1 and Q2 are turned off since neither has sufficient base bias to turn it on. However, under these conditions transistor Q3 is on since its base is positive and this makes the base of transistor Q4 positive turning it on which makes the base of Q5 negative turning it on causing voltage from the 24-volt power supply to be applied to line 84.

As the current through resistor R1 increases, the voltage on the base of transistor Q1 begins to go negative turning transistor Q1 on making the base of transistor Q2 more positive, thus turning it on which lowers the potential on the base of transistor Q3 turning it off which in turn lowers the potential on the base of transistor Q4 turning it off and this raises the potential on the base of transistor Q5 turning it off and thus interrupting current flow to the coils of circuit 75.

A resistor R2 and a capacitor 94 are placed between the base of the transistor Q1 and the collector of transistor Q2. When the current through resistor R1 is less than the maximum allowable current, transistor Q1 is in an "off" position and it is not until the current in the resistor R1 exceeds the maximum current and turns transistor Q1 on that transistor Q5 goes off interrupting the flow to the switch circuit 75. The current level at which transistor Q1 is turned off may be adjusted by adjusting the resistor R1. Once transistor Q1 is turned on signifying that the current has exceeded the predetermined maximum it will be held on for a minimum time period corresponding to the time constant for the resistance-capacitance circuit R2, 94. When transistor Q1 is on, transistor Q2 is on putting one side of the capacitor 94 at substantially ground potential. As the current through resistor R1 drops tending to raise the potential on the base of transistor Q1 and turn it off, the other side of the capacitor 94 tends to discharge through resistor R2 keeping the potential on the base of transistor Q1 sufficiently negative to hold it on until the capacitor 94 is fully discharged. In this manner, the current level at which the current limiter 72 turns the current flow to the coils off is higher than the level at which the current is turned on. This thereby prevents undesirable high-frequency, on-off operation of the circuit by placing a hysteresis loft in the circuit.

Figure 8:
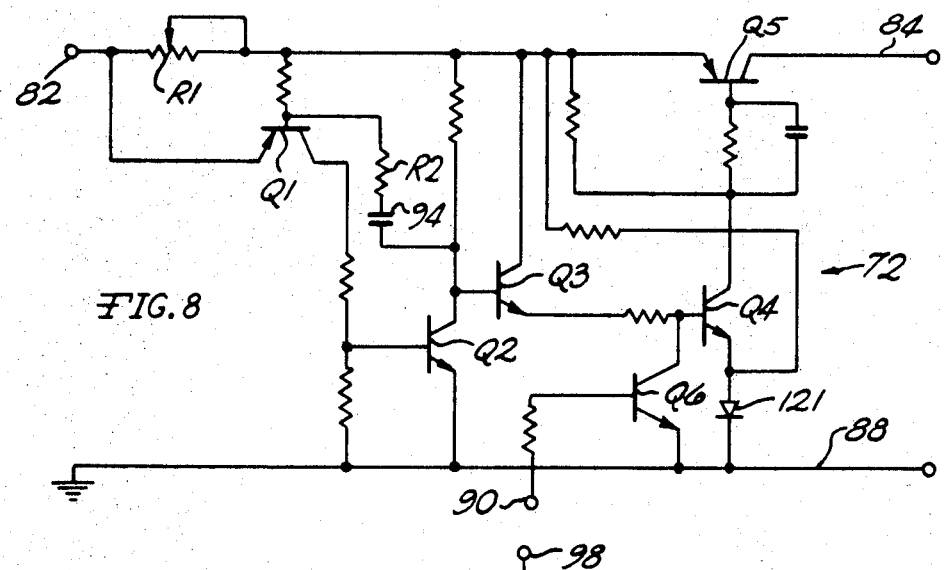
FIG. 8 is a wiring diagram showing the coil current limiting circuit.
Figure 9:
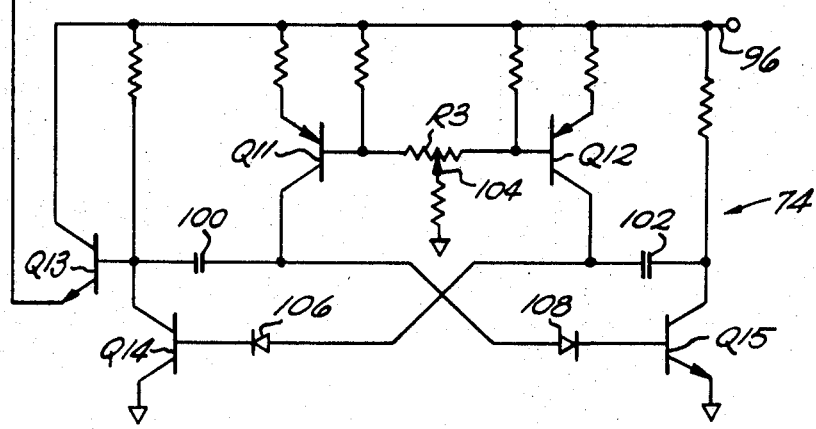
FIG. 9 is a wiring diagram of the multivibrator coil current control circuit.

FIG. 9 shows a variable coil current control circuit 74 in greater detail. As previously mentioned, the transistor Q6 in the coil current limiter circuit 72 (FIG. 8) is used for coupling the variable coil current control circuit 74 to the coil current limiter circuit 72. When current is flowing in the circuit 72, circuit 74 provides an additional means for turning it off to control the average current flow to the motor coils in circuit 75.

The circuit shown in FIG. 9 contains an astable multivibrator having lead 96 connected to a 24-volt power supply and having an emitter terminal 98 of a transistor Q13 connected to the base terminal lead 90 of the transistor Q6 in the current limiter circuit 72 of FIG. 8.

In the circuit 74, transistors Q11 and Q12 are current sources with their collectors connected respectively to timing capacitors 100 and 102 to charge these capacitors. The relative rates at which the capacitors 100 and 102 are charged is determined by the position of the potentiometer pointer 104 along a resistor R3 connecting the base of the transistors Q11 and Q12. By moving the contact or pointer 104 to the right as viewed in FIG. 9, the voltage on the base of the transistor Q12 will become more negative relative to the voltage on the base of the transistor Q11 thereby increasing the current flow through transistor Q12 and charging capacitor 102 faster than capacitor 100.

In the operation of the variable current control circuit 74 shown in FIG. 9, transistors Q14 and Q15 operate alternately with the base of the transistor Q13 being connected to the collector of the transistor Q14 so that the transistor Q13 is off when the transistor Q14 is on. When transistor Q14 is on, capacitor 102 is discharging through a diode 106 and the capacitor 100 is negative while transistor Q14 is on thereby biasing a diode 108 off and the transistor Q15 off. However, while diode 108 is off, the charge from transistor Q11 is building up on capacitor 100 and when it reaches a point sufficient to bias diode 108 to conduct, transistor Q15 will start conducting bringing capacitor 102 to ground potential which will turn off the diode 106 and the transistor Q14. When transistor Q14 is turned off, the potential on the base of transistor Q13 will be turned on raising the potential at the base of transistor Q6 in circuit 72 (FIG. 8) turning it on which will lower the base of the transistor Q4 turning it off and thus effecting the current flow to the current coils. The relative time the transistor Q14 is off or on depends on the rate of charging of capacitors 100 and 102 which is determined as mentioned by the position of potentiometer control pointer 104 on the resistor R3.

The longer the transistor Q13 is off the longer the transistor Q4 is off and the longer the transistor Q5 is on and current is being conducted through the motor coils. Since the position of pointer 104 determines the charging rate to capacitors 100 and 102 it will determine the amount of time that the coils receive current from the 24-volt source. By moving pointer 104, power applied to the motor can be varied from 10 percent to 90 percent full power. This is possible since the "on-time" of the circuit in FIG. 9 can be varied for about 1 millisecond to 9 milliseconds.

Figure 10:
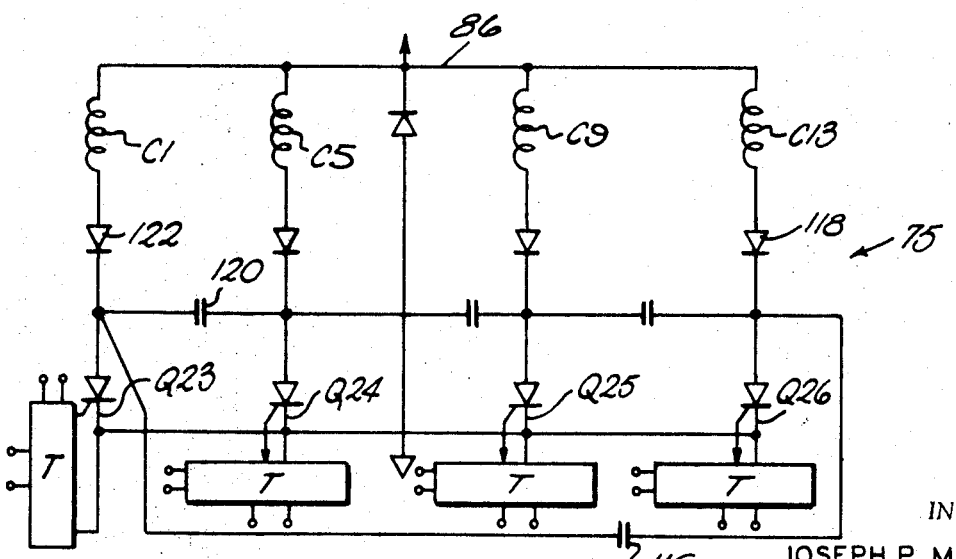
FIG. 10 is a wiring diagram of the stator coil energizing circuit.
Figure 11:
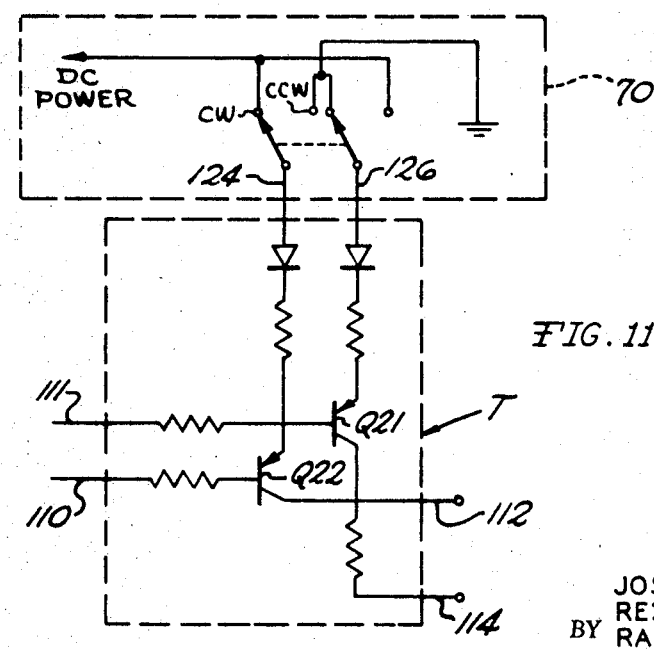
FIG. 11 is a wiring diagram showing the electrical pulse trigger circuit.

The motor coil switch circuit 75 and the trigger circuit T are shown more particularly in FIGS. 10 and 11, respectively. The motor coil switch circuits 75—78 are identical so only the circuit 75 is shown in detail in FIG. 10 in which the trigger circuits are shown in box form. The function of the motor coil switch is to provide a fast and positive switch-on and switch-off of the silicon-controlled rectifiers Q23—26 in the circuit. The light-actuated, silicon-controlled rectifiers S1—16 each produce a rather small signal and by using silicon-controlled rectifiers Q23—26 in the motor coil switch circuit, the small signal can be amplified to the current necessary to energize the motor coils C1—16. However, one problem with using silicon-controlled rectifiers is that once they are turned on they tend to stay on, thereby making high commutation rates difficult. The circuit 75 solves the problems involved in getting a high commutation rate.

Assuming a pulse is received through conductor 110 from light-activated switch S3 to the base of the transistor Q22 in the trigger circuit T shown in FIG. 11 and the direction control is clockwise (CW), transistor Q22 is turned on and the cathode of silicon-controlled rectifier Q23, which is connected to Q22 by conductors 112 and 114, becomes positive turning it on causing coil C1 to conduct. When the anode voltage of Q23 drops as it turns on, this negative voltage change is coupled by means of capacitor 116 to the anode of silicon-controlled rectifier Q26, which was the previously fired rectifier in circuit 75, to turn it off. This causes a large back electromotive force to be developed in coil C13 which raises the voltage of capacitor 116 and thereby prepares rectifier Q26 for triggering in a subsequent cycle. Reverse flow from capacitor 116 back to coil C13 is prevented by diode 118. In like manner, when the trigger circuit for silicon-controlled rectifier Q24 fires causing it to conduct, the voltage on a capacitor 120 will be lowered on both sides turning off silicon-controlled rectifier Q23 causing the current in coil C1 to stop flowing with the resultant back electromotive force charging through a diode 122 to raise the potential of capacitor 120 thus preparing rectifier Q23 for triggering on the next cycle. This same sequence is repeated for each of the coils firing in the circuit 75.

A diode 121 (FIG. 8) is placed in a line between the current limiter and ground so that when the current-limiting circuit 72 opens, the back electromotive force developed in the conducting coil will have a path to ground through diode 121 so that it will not injure the components of the current-limiting circuit.

The trigger circuit T shown in FIG. 11 includes the leads 112 and 114 which connect to the silicon-controlled rectifiers Q23—26 shown in FIG. 10, the lead 110 which connects to the anode of the light-actuated, silicon-controlled rectifier S3 and a lead 111 which connects to rectifier S15. Conductors 124 and 126 connect the trigger circuit to the clockwise (CW) and counterclockwise (CCW) lines from the direction control circuit 70. Assuming the direction control circuit 70 is set for clockwise (CW) operation, the next signal will be supplied to the emitter of the transistor Q22. When rectifier S3 is made conducting by a light beam striking it, transistor Q22 will conduct causing a current flow through conductor 112 to make silicon-controlled rectifier Q23 conduct. Similarly, if direction control 70 is set for counterclockwise (CCW) operation, a signal will be applied to the emitter of a transistor Q21 and when the light commutation actuates S15, then transistor Q21 will conduct energizing transistor Q23. The light-actuated, silicon-controlled switches S1—16, inclusive, are each connected to two coil circuits to energize the coils in their proper sequence for clockwise or counterclockwise operation depending on the signal applied to the conductors 124 and 126 of the trigger circuit T for each coil. Direction control 70 applies either all clockwise or all counterclockwise signals to the trigger circuits.

Figure 12:
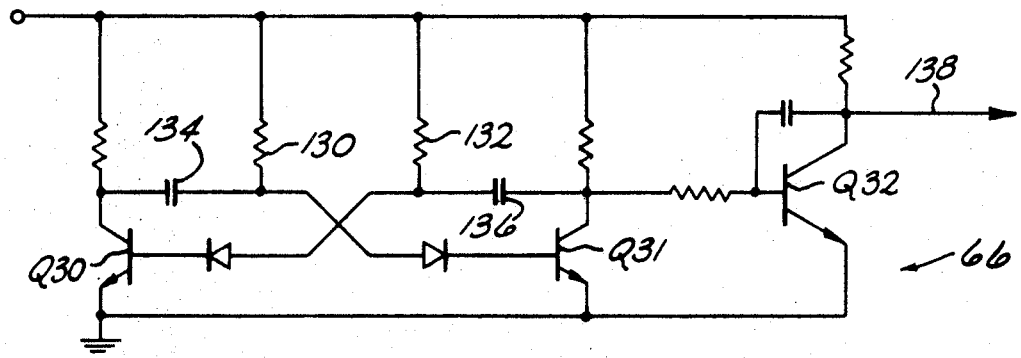
FIG. 12 is a wiring diagram of the multivibrator oscillator for the light-activated silicon-controlled rectifier circuit.

FIG. 12 shows in detail the multivibrator oscillator circuit shown generally as 66 in FIGS. 6 and 7. This oscillator circuit 66 operates in a manner somewhat similar to the multivibrator circuit 74 shown in FIG. 9. In the oscillator circuit 66, transistors Q30 and Q31 alternately are in conduction. Resistors 130 and 132 charge capacitors 134 and 136 at an equal rate. When transistor Q31 is conducting, the voltage on both plates of capacitor 136 is instantaneously lowered, so that transistor Q30 is turned off due to its connection to the base of transistor Q31. A charge begins to build on the left plate of capacitor 136 until it reaches the point where transistor Q30 is turned on at which time both plates of capacitor 134 are reduced substantially in voltage turning off transistor Q31 and so forth maintaining an oscillation cycle. The base of a transistor Q32 is connected to the emitter of transistor Q31. When transistor Q31 is conducting and transistor Q32 is off, conductor 138 is at 24 volts. When transistor Q31 is off, transistor Q32 is on lowering the voltage at conductor 138 substantially to ground potential.

As shown in FIG. 7, conductor 138 is connected to the cathodes of the light-actuated, silicon-controlled rectifiers S1—16. When the output in conductor 138 is low, the light-actuated rectifiers which are exposed to the commutation light will fire, thereby triggering the respective silicon-controlled rectifiers such as rectifier Q23 (FIG. 10) in circuit 75. When the output in the conductor 138 is high, the current in each of the light-actuated, silicon-controlled rectifiers will drop below the value necessary to hold it on and the light-actuated rectifier will return to a nonconducting state. As mentioned earlier, the oscillator circuit period is less than the shortest "on-time" for the silicon-controlled rectifiers so that normally the silicon-controlled rectifiers will receive several trigger pulses while they are on.

From the above description it is seen that this invention provides an electromotive device consisting basically of the following components:

a. a stator-mounted gear 20 having a full circle of teeth 22 arranged on a pitch circle of a certain diameter,
b. an output gear 28 having a full circle of teeth 30 arranged on a pitch circle having a certain diameter and which is concentric with the stator gear pitch circle; and
c. a floating armature-mounted ring gear 34 having a full circle of teeth 40 arranged on a pitch circle having a diameter different than the pitch circle for the output gear teeth 30, and a full circle of teeth 42 arranged on a pitch circle having a diameter different than the pitch circle for the stator gear teeth 22.

At least one of the ring gear teeth 42 is always drivingly engaged with a stator tooth and at least one of the ring gear teeth 40 is always drivingly engaged with an output gear tooth. Four of the coils C1—16 are energized at all times to provide a force vector directed radially of the axis 32 and applied to the ring gear 34. As the light shield 60 rotates it provides for deenergization of the trailing coil and energization of another coil in the direction of rotation so as to continually move the force vector by angular increments of one sixteenth of 360°, namely, 22½°, in the illustrated motor 10. This moving force vector on the ring gear 34 causes it to roll on the stationary gear 20 so as to orbit the ring gear axis 38 about the axis 32. As a result, when the axis 38 of the armature 18 is orbited about the axis 32 of the stator, so as to cause epicyclic movement of armature 18, a combination motor transmission unit 10 is obtained in which a desired transmission ratio can be obtained by proper selection of gear size and location.

While the ring gear 34 is illustrated in a form which will rotate relative to the axis 32, it is to be understood that the motor 10 can be constructed so that the ring gear 34 does not rotate, as shown in copending application Ser. No. 523,111. In any event, the ring gear axis 38 will orbit or gyrate about the axis 32, with or without such rotation.

In the motor 10, the coils C1—16 of the motor are commutated by electrical power controlled by light-actuated semiconductors which are successively illuminated and thus actuated to energize the coils. The light-actuated semiconductors trigger a silicon-controlled rectifier which is in a coil circuit closing the circuit so electrical power passes through the coil. A capacitor is placed between adjacent coils and between adjacent silicon-controlled rectifiers, and when the following rectifier is actuated it changes the voltage instantaneously on both sides of the capacitor turning off the previous rectifier and storing the resulting back electromotive force of the previous coil to bias a previous rectifier for firing when triggered on the next cycle of the light-actuated semiconductor.

In addition circuits are provided which are placed between the coil and source voltage which will vary the amount of time that the source voltage is in communication with the coil to accurately control the power output of the motor. A multivibrator circuit wherein the power supply is alternately on and off is provided with a potentiometer connecting the base of the two current source transistors which charge the timing capacitor according to the position of the potentiometer contact. The charging time on the capacitor determines the on and off period hence varying the amount of voltage on the coils. A current limiter circuit is provided which has a built-in hysteresis effect so that the coil circuit is open at one level of current and is closed at a second lower level of current thereby preventing the condition where the transistor switches are opening and closing rapidly at the threshold current and in effect are one-half off causing overheating and component failure. In effect a rotating light beam is achieved which actuates light-sensitive means to create a rotating magnetic field. The rotating magnetic field causes an epicyclic member to rotate around the field and drives an output shaft through epicycle motion. In such a manner an extremely high-speed rotation of the magnetic field and an extremely low-speed rotation of an output shaft with few mechanically rotating members are obtained and these parts are so designed as to have a minimum of frictional losses.

It will be understood that the self-commutated electromotive device which is herein disclosed and described is presented for purposes of explanation and illustration and is not intended to indicate limits of the invention, the scope of which is defined by the following claims.

We claim:

1. An actuator comprising:
   a stationary member;
   a rotatably mounted output member;
   said members being arranged in a coaxial relation;
   a floating ring member drivingly engaged with said stationary member at one point on said ring member and drivingly engaged with said output member at another point on said ring member;
   said ring member having an axis arranged eccentric with respect to the axis of said stationary and output members;
   means providing a moving force vector applied to said ring member in a direction substantially perpendicular to said stationary and output member axis and moving in one direction about said axis to cause said ring member axis to orbit about said stationary and output member axis;
   said last-mentioned means comprising electromagnet means arranged in a circular formation concentric with said stationary and output members and armature means concentric with said ring member and adjacent said electromagnet means for movement thereby;
   means responsive to rotation of said output member for sequentially energizing said electromagnet means in said one direction;
   said electromagnet means includes a plurality of individual electromagnet coils equally spaced in a direction circumferentially of said circular formation;
   said means for sequentially energizing said electromagnet means including switching means for sequentially energizing said coils, said switching means including;
   a light source;
   light-responsive members arranged in a substantially circular formation about said light source;
   a light shield extended about said light source at a position between said light source and said light-responsive members;
   said light shield having an opening therein of a size such that light from said source can pass therethrough and fall on a predetermined number of said light responsive members; and
   means rotating said light shield in response to rotation of said output member.

2. An actuator according to claim 1 wherein said means for rotating said light shield provides for rotation thereof at a speed which is proportioned relative to the speed of rotation of said output shaft which is the inverse of the ratio of the speed of rotation of said force vector relative to the speed of rotation of said output shaft.

3. An actuator according to claim 1 wherein:
   the number of said light-responsive members corresponds to the number of said coils, and
   wherein each of said light-responsive members is electrically connected to a corresponding one of said coils to provide for energizing thereof when light from said source falls on said light-responsive member, and
   wherein said predetermined number is more than one so that more than one of said coils is energized at all times.

4. An actuator according to claim 3 wherein:
   said coils are arranged in quadrants with a plurality of coils in each quadrant and with an equal number of coils in each quadrant;
   and further including a switch member connected between each of said light-responsive members and the coil corresponding thereto;
   said switches being arranged in four sections with correspondingly located coils from each quadrant in each section;
   means circuit connecting the coils in each section including trigger means for each coil;
   said last-mentioned means including capacitor means for utilizing the back electromotive force generated by each coil on energization thereof for biasing the trigger means for the corresponding coil in an adjacent quadrant for triggering when the light-responsive member corresponding thereto is next actuated.

5. An actuator according to claim 1 wherein said switching means further includes:
   a plurality of signal switches; and
   circuit means connected to said coils and said signal switches so as to provide for energizing of said coils in response to predetermined signals from said switches.

6. In an electromotive device:
   a stator;
   a plurality of electromagnets arranged in a circular formation on said stator;
   each of said electromagnets including a pole and a coil;
   an armature having an axis;
   said armature being disposed adjacent said electromagnets and being mounted so that said electromagnets are capable of applying sequential radially directed forces to said armature causing the axis of said armature to orbit about the axis of said circular formation;
   an output member arranged in a driven relation with said armature for rotation in response to said movement thereof; and
   means for energizing said electromagnet coils in a predetermined sequence;
   said last-mentioned means including shaft means operatively associated with said output member for rotation in response to said rotation thereof, a source of light, and a plurality of light actuatable switch means connected to said coils and operatively associated with said source of light and said shaft means to provide for sequential actuation of said switch means by said light source in response to rotation of said shaft means.

7. An electromotive device according to claim 6 wherein said switch means includes:
   a plurality of light-actuatable, silicon-controlled rectifiers arranged in a circular path concentric with said shaft means;
   a plurality of gate-controlled semiconductor switches corresponding in number to the number of said electromagnets and the number of said rectifiers;
   each of said switches being circuit connected to a corresponding rectifier and a corresponding electromagnet so that when light from said source is directed onto the corresponding rectifier said switch provides for a current supply to the corresponding electromagnet and when light is removed from said rectifier said switch is automatically reset so as to discontinue said current supply; and
   means providing for direction of light from said source onto said rectifiers in sequence.

8. An electromotive device according to claim 7 wherein:
   said coils are arranged in quadrants with a plurality of coils in each quadrant and with an equal number of coils in each quadrant; and
   wherein said switches are arranged in four sections with correspondingly located coils from each quadrant in each section;
   means circuit connecting the coils in each section including trigger means for each coil;
   said last-mentioned means including capacitor means for utilizing the back electromotive force generated by each coil on energization thereof for biasing the trigger means for the corresponding coil in an adjacent quadrant for triggering when the light-actuatable, silicon-controlled rectifier corresponding thereto is next actuated.

9. An electromotive device according to claim 8 further including direction control switching means connected to said switch sections and operable to reverse the sequency of operation of the switches therein to provide for reverse rotation of said output member.

10. An electromotive device according to claim 6 further including:
    current limiting circuit means connected to said coils for limiting the magnitude of the current flowing therethrough;
    said current limiting circuit means including first and second transistor means; and
    variable resistance means and capacitor means circuit connecting said transistor means so that upon current-limiting change of conduction of one transistor means a change of conduction of the other transistor means is delayed by a time period equal to the time constant of the resistance and capacitor means combination.

11. An electromotive device according to claim 10 further including:
    a power supply circuit connected to said current-limiting circuit means and said coils;
    said power supply circuit including oscillator means having a period less than said delay-time period so that each coil will receive several power supply pulses during each energization thereof.

12. An electromotive device according to claim 8 wherein:
    said means circuit connecting the coils in each section further includes silicon-controlled rectifier diode means connected to said trigger means for each of said coils; and
    capacitor means connected between adjacent diode means providing for an instantaneous lowering of the voltage on the anode of a previously actuated diode means by the actuation of the next actuated diode means in a cycle.

13. In an electromotive device;
    a substantially circular stator of electromagnetic material having a plurality of radially extending poles;
    an electrical coil wound around each of said poles so as to produce magnetic fields when electric current flows through said coils;
    an armature of electromagnetic material eccentrically disposed with respect to said stator and capable of being moved by said magnetic field;
    an output shaft drivingly connected to said armature for rotation thereby;
    light-actuated means operatively connected to said coils so as to sequentially energize said coils to produce sequentially a plurality of magnetic fields capable of moving said armature to rotate said output shaft;
    said fields being sequentially produced in one direction moving circumferentially about said stator so as to create a force vector on said armature which is directed substantially radially of said stator and moves about said armature in said one direction; and
    means for controlling the average magnitude of the electrical current being introduced into said coils to produce a predetermined amount of mechanical energy at said output shaft.

14. In an electromotive device as claimed in claim 13 in which the means for controlling the average magnitude of the electrical current supplied to said coils includes means for supplying a pulse of current to each of said coils, and means for varying the time period length of said pulses.

15. In an electromotive device as claimed in claim 13 further including a multivibrator circuit means capable of producing pulsating unidirectional current and connected in circuit with said coils for supplying pulsating unidirectional current thereto.